US010970852B2

(12) United States Patent
Ordway

(10) Patent No.: US 10,970,852 B2
(45) Date of Patent: Apr. 6, 2021

(54) SYSTEMS AND METHODS FOR MULTI-SIGNATURE COUNTERMEASURE TESTING

(71) Applicant: Alloy Surfaces Company, Inc., Chester Township, PA (US)

(72) Inventor: Matthew R. Ordway, Downingtown, PA (US)

(73) Assignee: ALLOY SURFACES COMPANY, INC., Chester Township, PA (US)

( * ) Notice: Subject to any disclaimer, the term of this patent is extended or adjusted under 35 U.S.C. 154(b) by 71 days.

(21) Appl. No.: 16/371,339

(22) Filed: Apr. 1, 2019

(65) Prior Publication Data

US 2020/0311950 A1 Oct. 1, 2020

(51) Int. Cl.
| | |
|---|---|
| G06T 7/521 | (2017.01) |
| G06T 7/246 | (2017.01) |
| H04N 5/33 | (2006.01) |
| G06T 7/11 | (2017.01) |
| G06T 5/00 | (2006.01) |
| G01J 5/10 | (2006.01) |
| G01J 5/00 | (2006.01) |

(52) U.S. Cl.
CPC .............. *G06T 7/246* (2017.01); *G06T 5/002* (2013.01); *G06T 5/007* (2013.01); *G06T 7/11* (2017.01); *H04N 5/33* (2013.01); *G01J 5/10* (2013.01); *G01J 2005/0077* (2013.01); *G06T 2207/10048* (2013.01); *G06T 2207/20208* (2013.01); *G06T 2207/30212* (2013.01); *G06T 2207/30241* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,999,652 A | * | 12/1999 | Bushman | ................ F41H 11/02 382/103 |
| 6,093,498 A | | 7/2000 | Baldi | |
| 6,258,461 B1 | | 7/2001 | Baldi et al. | |
| 7,230,221 B2 | * | 6/2007 | Busse | ................... G01J 1/4228 250/203.6 |
| 7,421,950 B2 | | 9/2008 | Dillard et al. | |
| 7,536,045 B2 | * | 5/2009 | Alessi | ...................... G06K 9/00 382/129 |
| 7,916,065 B1 | * | 3/2011 | Mintz | ..................... F41H 11/02 342/13 |

(Continued)

*Primary Examiner* — Cindy Trandai
(74) *Attorney, Agent, or Firm* — Polsinelli PC

(57) ABSTRACT

Systems, methods, and computer-readable media are provided for an autonomous and fully automated method of validating multi-signature decoys that are configured to release infrared flares at multiple points after launch. In one aspect, a method includes capturing, using at least one image capturing device, raw image data of a launched decoy, the decoy having one or more segments configured to be released after launch and automatically processing the raw image data to (1) identify a release point for each of the one or more segments and (2) identify an infrared signature associated with each release point. The method further includes generating a visual display of the release point(s) of the one or more segments and the infrared signature(s) originating from the release point(s).

17 Claims, 10 Drawing Sheets

(56) References Cited

U.S. PATENT DOCUMENTS

| | | | |
|---|---|---|---|
| 8,049,656 B2 * | 11/2011 | Shani | H01Q 9/16 342/14 |
| 8,783,186 B2 | 7/2014 | Scanlon et al. | |
| 8,902,085 B1 * | 12/2014 | Ray | F41H 11/02 340/961 |
| 9,446,386 B2 | 9/2016 | Durante et al. | |
| 9,538,081 B1 * | 1/2017 | Zhou | G06K 9/00201 |
| 2004/0061595 A1 | 4/2004 | Yannone et al. | |
| 2006/0096493 A1 | 5/2006 | Swanson | |
| 2007/0039505 A1 | 2/2007 | Dillard et al. | |
| 2007/0159379 A1 | 7/2007 | Bannasch et al. | |
| 2008/0205717 A1 * | 8/2008 | Reeves | G06T 5/002 382/128 |
| 2009/0035054 A1 | 2/2009 | Lye et al. | |
| 2009/0095186 A1 | 4/2009 | Dillard et al. | |
| 2009/0308273 A1 * | 12/2009 | Chirivella | F41G 7/2293 102/377 |
| 2011/0036260 A1 | 2/2011 | Herbage et al. | |
| 2011/0168047 A1 | 7/2011 | Hahma | |
| 2011/0283912 A1 | 11/2011 | Dillard et al. | |
| 2012/0314080 A1 * | 12/2012 | Lee | G01M 3/002 348/159 |
| 2014/0022388 A1 * | 1/2014 | Hiebl | G01S 17/87 348/144 |
| 2014/0196597 A1 | 7/2014 | Le Croller et al. | |
| 2014/0208973 A1 | 7/2014 | Dillard et al. | |
| 2016/0010952 A1 * | 1/2016 | McGeehan | F41J 9/08 701/302 |
| 2016/0109288 A1 * | 4/2016 | Mercier | G01J 1/4228 702/189 |
| 2017/0132889 A1 * | 5/2017 | Carskadon | H04N 21/6125 |
| 2018/0077364 A1 * | 3/2018 | Neal | H04N 5/3535 |
| 2018/0164820 A1 * | 6/2018 | Aboutalib | G05D 1/0808 |
| 2019/0078966 A1 * | 3/2019 | Zhang | G01M 3/38 |
| 2019/0187000 A1 * | 6/2019 | Gamfeldt | G01J 5/0014 |
| 2019/0187019 A1 * | 6/2019 | Ekeroth | G01M 3/38 |
| 2019/0340914 A1 * | 11/2019 | Israelsen | G08B 21/182 |
| 2020/0116128 A1 * | 4/2020 | Pedersen | F03D 7/0296 |
| 2020/0116583 A1 * | 4/2020 | Hedberg | G01J 5/0014 |
| 2020/0202127 A1 * | 6/2020 | Chen | G06K 9/00657 |

* cited by examiner

FIG. 9

SYSTEMS AND METHODS FOR MULTI-SIGNATURE COUNTERMEASURE TESTING

TECHNICAL FIELD

The present technology pertains in general to testing and validating decoys (countermeasures) and more specifically to a fully autonomous process for validating proper release of multi-signature decoys after launch.

BACKGROUND

Typically, a target such as a missile or an aircraft is provided with decoys which are used to draw various types of guided weapons away from the target. One of the most commonly used decoy devices are flares which are adapted to attract infrared or heat seeking guided missiles away from the deploying target. In this respect, the flare is designed to present a more attractive thermal target than the target from which it is deployed, thus decoying the weapon away from the target.

Such decoys (which may also be referred to as countermeasures) may have multiple release points at each of which a segment or portion of the content (infrared flares) of the decoy is released. It is critical to test and validate these decoys and proper release of each segment prior to deploying them for use with targets in combat.

Manual validating methods exist, which entail capturing images of a launched decoy and using software with a set of drawing tools that an operator can use to manually place region of interest (ROI) objects in space and along the captured images to enclose signatures and extract properties. This process can be tedious, is subjective, and is labor intensive depending on the number of captured frames and signatures that must be analyzed.

SUMMARY

One or more aspects of the present disclosure relate to an autonomous and fully automated method of validating multi-signature decoys that are configured to release infrared signatures at multiple points after launch.

One aspect of the present disclosure is a method that includes capturing, using at least one image capturing device, raw image data of a launched decoy, the decoy having one or more segments configured to be released after launch and automatically processing the raw image data to (1) identify a release point for each of the one or more segments and (2) identify an infrared signature associated with each release point. The method further includes generating a visual display of the release point(s) of the one or more segments and the infrared signature(s) originating from the release point(s).

Another aspect of the present disclosure is a system that includes at least one image capturing device; and one or more processors configured to execute computer-readable instructions stored in one or more memories to receive raw Image data of a launched decoy captured by the at least one image capturing device, the decoy having one or more segments configured to be released after launch; automatically process the raw image data to (1) identify a release point for each of the one or more segments; an (2) identify an infrared signature associated with each release point; and generate a visual display of the release point(s) of the one or more segments and the infrared signature(s) originating from the release point(s).

Another aspect of the present disclosure includes or more non-transitory computer-readable medium having computer-readable instructions stored thereon, which when executed by one or more processors, cause the one or more processors to capture raw image data of a launched decoy captured by at least one image capturing device, the decoy having one or more segments configured to be released after launch; automatically process the raw image data to (1) identify a release point for each of the one or more segments; and (2) Identify an infrared signature associated with each release point; and generate a visual display of the release point(s) of the one or more segments and the infrared signature(s) originating from the release point(s).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 is an example segmentation table for all five signatures of example of FIG. 8, according to an aspect of the present disclosure.

DETAILED DESCRIPTION

Figure 1:
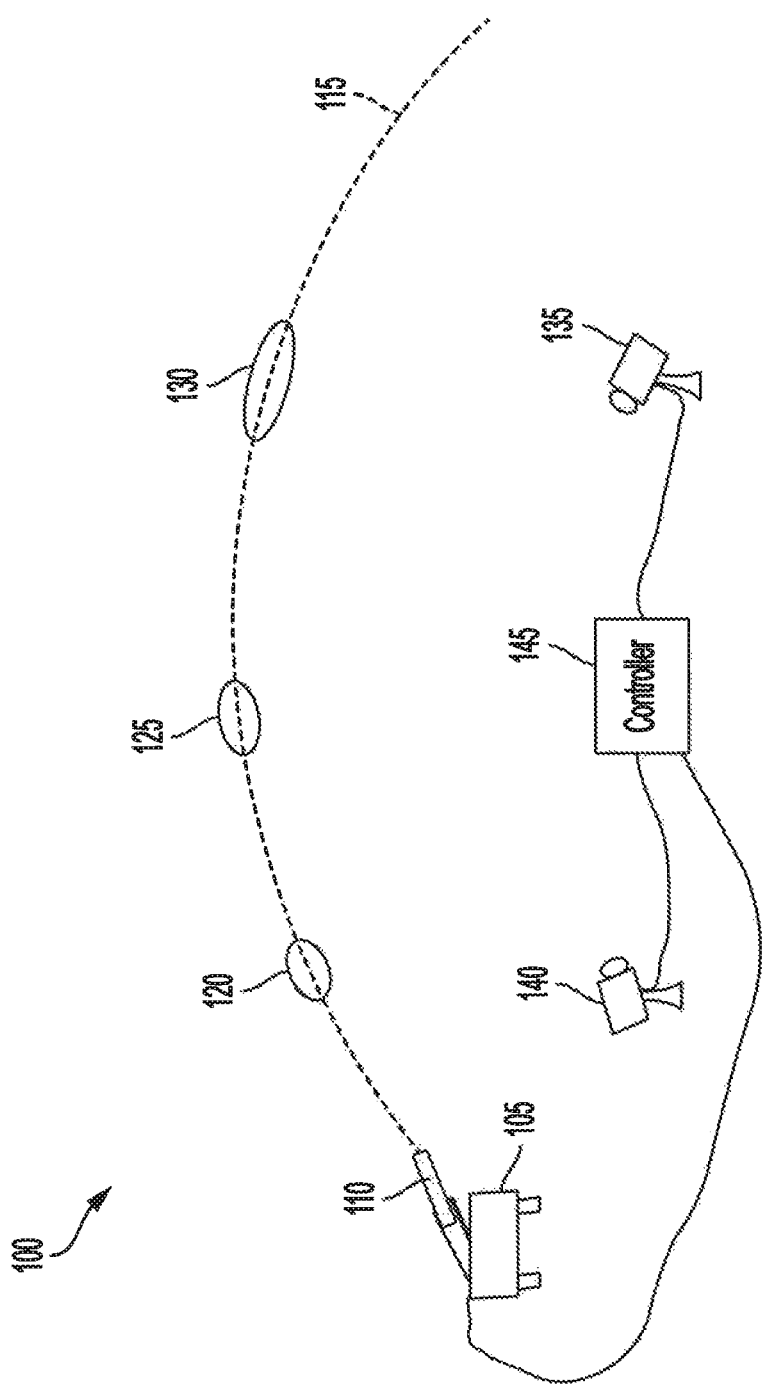
FIG. 1 illustrates an example testing setting, according to an aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, currently utilized methods for performing quality control and testing of countermeasures are tedious, inaccurate, subjective and inefficient. Hereinafter, examples will be described of a fully autonomous method of analyzing a launched countermeasure including an analysis of multiple releases of infrared flares along the launched trajectory and assessing a quality of the countermeasure based on the analysis.

FIG. 1 illustrates an example testing setting, according to an aspect of the present disclosure.

As shown in FIG. 1, setting 100 includes a launch pad 105 for launching decoy (countermeasure) 110. Decoy 110 may be a multi-signature decoy that is designed to release segments of flares along a launched trajectory 115 at example release points 120, 125 and 130. Release points 120, 125 and 130 are just examples and non-limiting. There may be more or less release points depending on the structure of decoy 110. Decoy 110 will be further described with reference to FIG. 2.

Launch pad 105 may be any known or to be developed platform for launching decoy 110.

Setting 100 further includes two image capturing devices 135 and 140. Each of image capturing devices 135 and 140 may be any known or to be developed image capturing device such as a camera.

Setting 100 further includes a controller 145. Controller 145 may be communicatively (wired or wireless) coupled to each of image capturing devices 135 and 140. Controller 145 may also be communicatively coupled to launch pad 105 and/or decoy 110. As will be described below, controller 145 may be configured to control each of image capturing devices 135 and 140 (control or adjust their settings, etc.) as well as launch pad 105 or decoy 110 to control timing or setting of launching decoy 110. Components of controller 145 will be further described below with reference to FIG. 10.

A decoy such as decoy 110 can be designed to be kinematic or pseudo-kinematic, producing one or more infrared radiation emitting clouds that give the appearance of a moving infrared target in the airspace in which the decoy has been released.

In one example, decoy 110 can include a plurality of bodies (e.g., bundles of pyrophoric elements) that emit infrared radiation after being activated and the decoy releases portions of the plurality of bodies sequentially (e.g., along trajectory 115 and at predetermined (designated) release points 120, 125 and 130). The bodies are activated either at the time of release or after release from the remainder of the decoy so that the released bodies emit infrared radiation. In this way, the release of multiple bodies that emit infrared radiation in a sequential manner as decoy 110 travels through the air creates an infrared pattern or signature that appears as a moving target.

Decoy 110 can be adapted and/or modified to protect a variety of targets, such as ground vehicles (e.g., trucks, transports, tanks), water vehicles (e.g., ships and hovercraft), aircraft (e.g., airplanes and helicopters), missiles (air to air missiles, surface to air missiles, surface to surface missiles, etc.). For example, when decoy 110 is released from a flying aircraft and, for a certain period of time, the decoy travels in the same direction as the aircraft (due to: (a) the momentum that the decoy has; or (b) propulsive forces generated in the release of the decoy from the aircraft; or (c) propulsive forces from an engine or motor contained on the decoy itself—such as a small jet engine or rocket motor; or any combination of (a) to (c)). As decoy 110 travels in the same direction as the aircraft that released it, decoy 110 sequentially releases its payload of bodies that emit infrared radiation, thus creating an infrared source or pattern that appears to be moving in the same direction as the aircraft.

Figure 2:
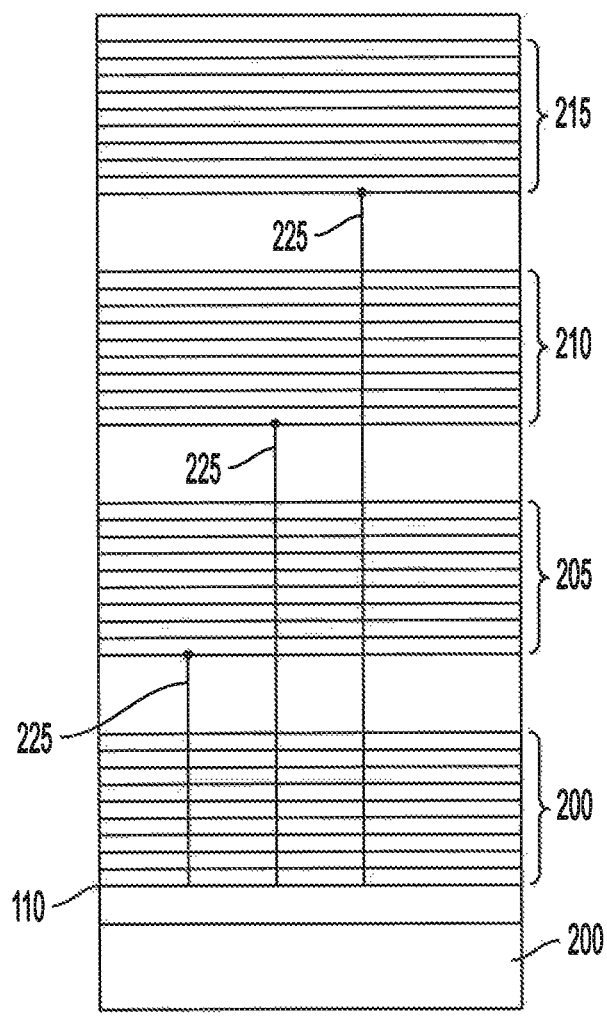
FIG. 2 is an example structure of a decoy, according to an aspect of the present disclosure.

FIG. 2 is an example structure of a decoy, according to an aspect of the present disclosure. As shown in FIG. 2, decoy 110 can have four Special Material (SM) bundles 200, 205, 210 and 215 (which may also be referred to as segments 200, 205, 210 and 215) and an anchoring element or body 220, which may also be referred to herein as the "base plate" 220. While in FIG. 2, an example of decoy 110 with four segments is being illustrated and described, the present disclosure is not limited thereto. For example, decoy 110 can have any number of segments (e.g., one segment, two segments, three segments, 5 segments, 10 segments, etc.).

One of the four SM bundles 200, 205, 210 and 215 may not be anchored to base plate 220 (e.g., bundle 215 in FIG. 2). In this case, bundle 215 is either not bound at all (i.e., bundle 215 is a loose group of pyrophoric elements located at the top of decoy 110) or is loosely bound so that bundle 215 will immediately or quickly break apart into the individual pyrophoric elements when decoy 110 is ejected from the target. Three of the four SM bundles (i.e., bundles 200, 205 and 210) are anchored to base plate 220 by wire straps 225. Straps 225 may be made of any known or to be developed material. For example, straps 225 can be made of metal wire or any other material that is strong enough to hold bundles 200, 205, 210 and/or 215 in place during the construction and use of decoy 110, such as plastic strapping or polymeric string or line, such as fishing line. Each of the three bundles 200, 205 and 210 is anchored to base plate 220 by a different wire strap 225. One end of each wire strap is permanently attached to base plate 220 while the other end of the same wire strap, after passing over the bundle that it is anchoring to piston 220, is attached to base plate 220 by an anchor loop (not shown). Each wire strap 225 can be attached to piston 220 by a different anchor loop. When an anchor loop for a particular wire strap 225 is broken (e.g., burned through by a fuse located on the base plate), the corresponding bundle (e.g., bundle 200, 205 and/or 210) that was held by that wire strap is released from decoy 110 into the surrounding air. The bundle is quickly broken up by the force of the moving air to create a cloud of pyrophoric elements that emit infrared radiation after a short rise time. See, e.g., U.S. Pat. Nos. 7,421,950, 7,992,496, 8,276,518, and 9,222,762, which are incorporated herein by reference in theft entirety.

Bundles can be released from base plate 220 sequentially, with the bundle that is furthest away from the piston (e.g., bundle 215) being the first bundle released from piston 220 followed by bundles 215, 210 and 200. This sequential release is achieved by the arrangement of the anchor loops on a fuse (not shown). Specifically, the fuse passes through each of the anchor loops and burns in the direction from the bop holding the bundle that is furthest from piston 220 towards the loop holding the bundle that is closest to piston 220.

In one example, decoy 110 may have one or more electronic components bunt therein for establishing data communication with controller 145 and/or launch pad 105. The electronic components can be any known or to be developed component for establishing short range data communication session (e.g., Bluetooth transceiver, etc.)

Figure 3:
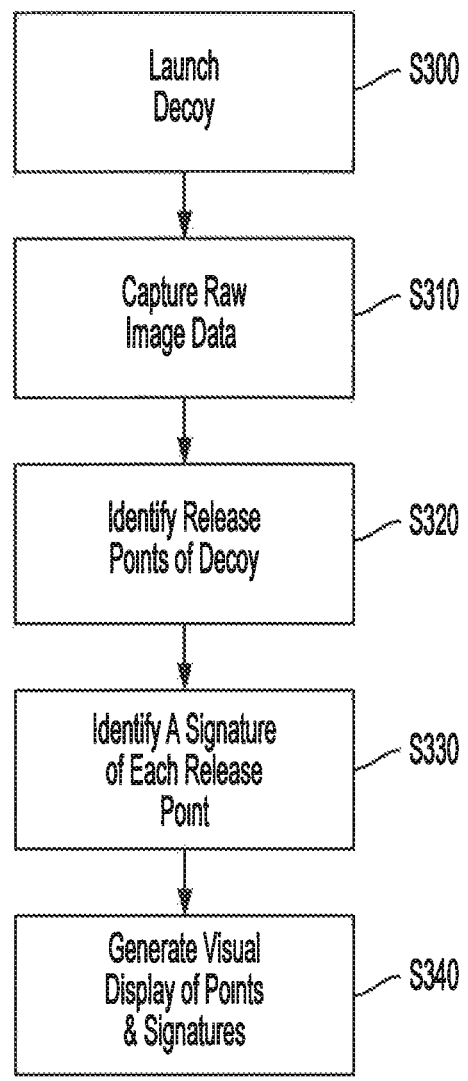
FIG. 3 is an example method of validating a decoy, according to an aspect of the present disclosure.

Having described examples of setting 100 and decoy 110, the disclosure now turns to describing examples of an autonomous method of validating and testing a decoy. FIG. 3 is an example method of validating a decoy, according to an aspect of the present disclosure. FIG. 3 will be described from the perspective of controller 145 of FIG. 1. However, it will be understood that controller 145 may have one or more processors configured to execute computer-readable instructions stored in one or more associated memories for performing the steps of FIG. 3.

At S300, controller 145 launches decoy 110. In one example, controller 145 (which is communicatively coupled to launch pad 105 and/or decoy 110) may send a command to launch pad 105 or decoy 110 (using any known or to be developed wired and/or wireless communication protocol) to launch decoy 110.

At S305, controller 145, using image capturing devices 135 and 140 captures raw image data of the launched decoy 110. As noted above, decoy 110, after launch, may travel along trajectory path 115 and release segments 200, 205, 210 and/or 215 along trajectory path 115 sequentially and at different times (which may be referred to as release points).

At S310 and based on the raw image data, controller 145 identifies release points of decoy 110. Controller 145 identifies a release point associated with each segment release of decoy 110. S310 and identification of release points, will be further described with reference to FIG. 4.

Thereafter at S315, controller 145 identifies a signature (an infrared signature) associated with each identified release point. S315 will be further described with reference to FIG. 4 as well.

At S320, controller 145 generates a visual display of the identified release points and associated signatures (radiant intensities) to be displayed on a display associated with controller 145. This visual display may present an operator (e.g., a quality control specialist) with a visual indication of decoy 110's performance. As part of the visual display, controller 145 may also provide a visual rating Indicative of a quality of decoy 110. The visual rating (e.g., a numerical value) may fall within a scale having a minimum value indicative of lowest quality of performance for decoy 110 and a maximum value indicative of higher quality of performance for decoy 110. Such scale may be a 0-10 scale. In one example, controller 145 may assign a "passing" rating to decoy 110, if the assigned rating value is greater than a threshold (e.g., 5, 6 or 7 on the 0-10 scale).

Figure 4:
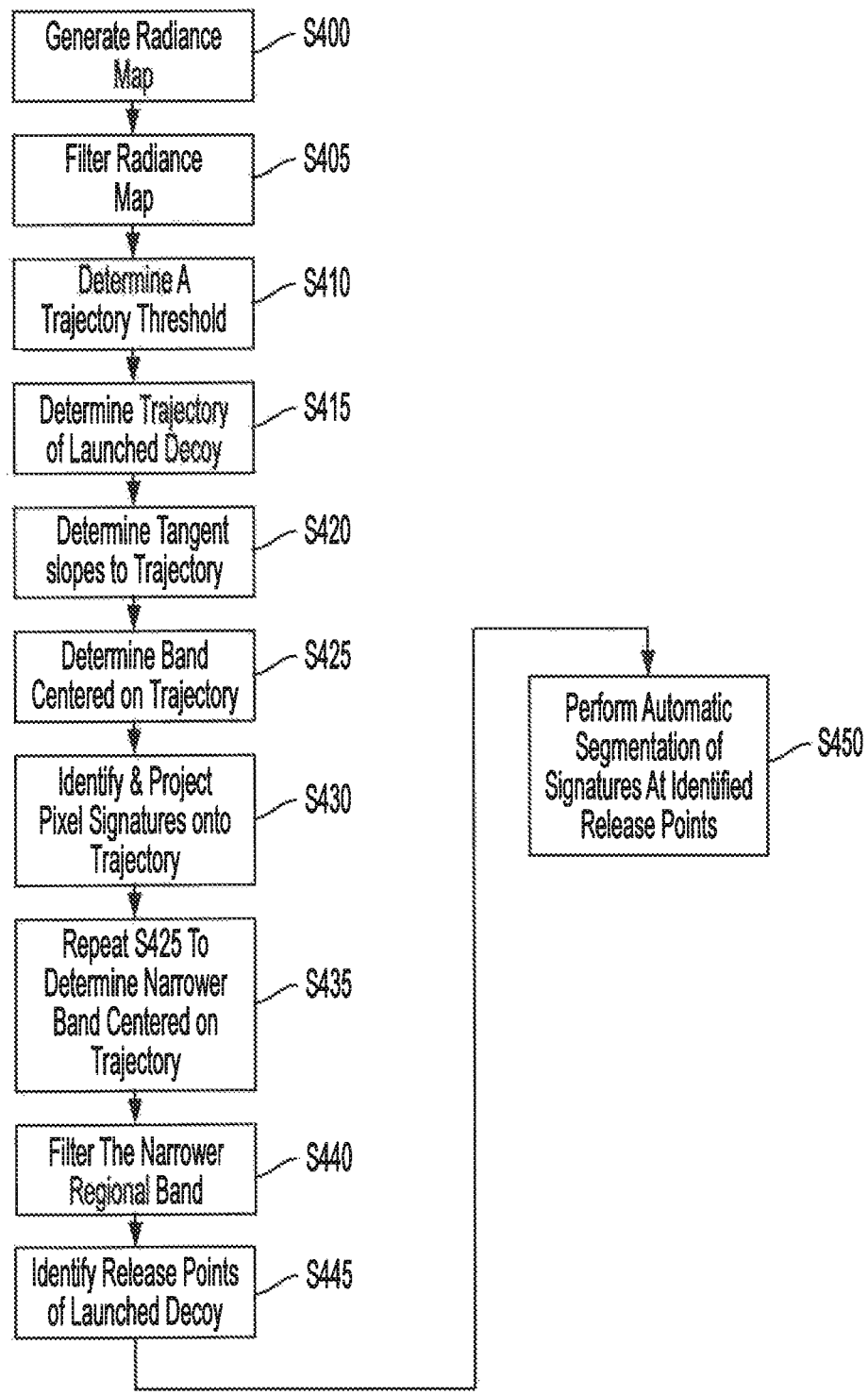
FIG. 4 is an example method of identifying release points of a decoy and associated signatures, according to an aspect of the present disclosure.

In determining such numerical value, controller 145 may have access to information about theoretical or predetermined release points (and associated infrared signatures) at which decoy 110 is supposed to release segments sequentially as well as intensity of infrared signatures deemed satisfactory. Accordingly, each identified release point and associated infrared signature may be compared to such information to determine a visual rating, FIG. 4 is an example method of identifying release points of a decoy and associated signatures, according to an aspect of the present disclosure. FIG. 4 describes a method of validating a decoy, according to an aspect of the present disclosure. FIG. 4 will be described from the perspective of controller 145 of FIG. 1. However, it will be understood that controller 145 may have one or more processors configured to execute computer-readable instructions stored in one or more associated memories for performing the steps of FIG. 4.

As noted above, details of identifying release points and associated radiation intensities (S310 and S315) will be described with reference to FIG. 4. In one example, identifying release points of decoy 110 is as follows.

Figure 5:
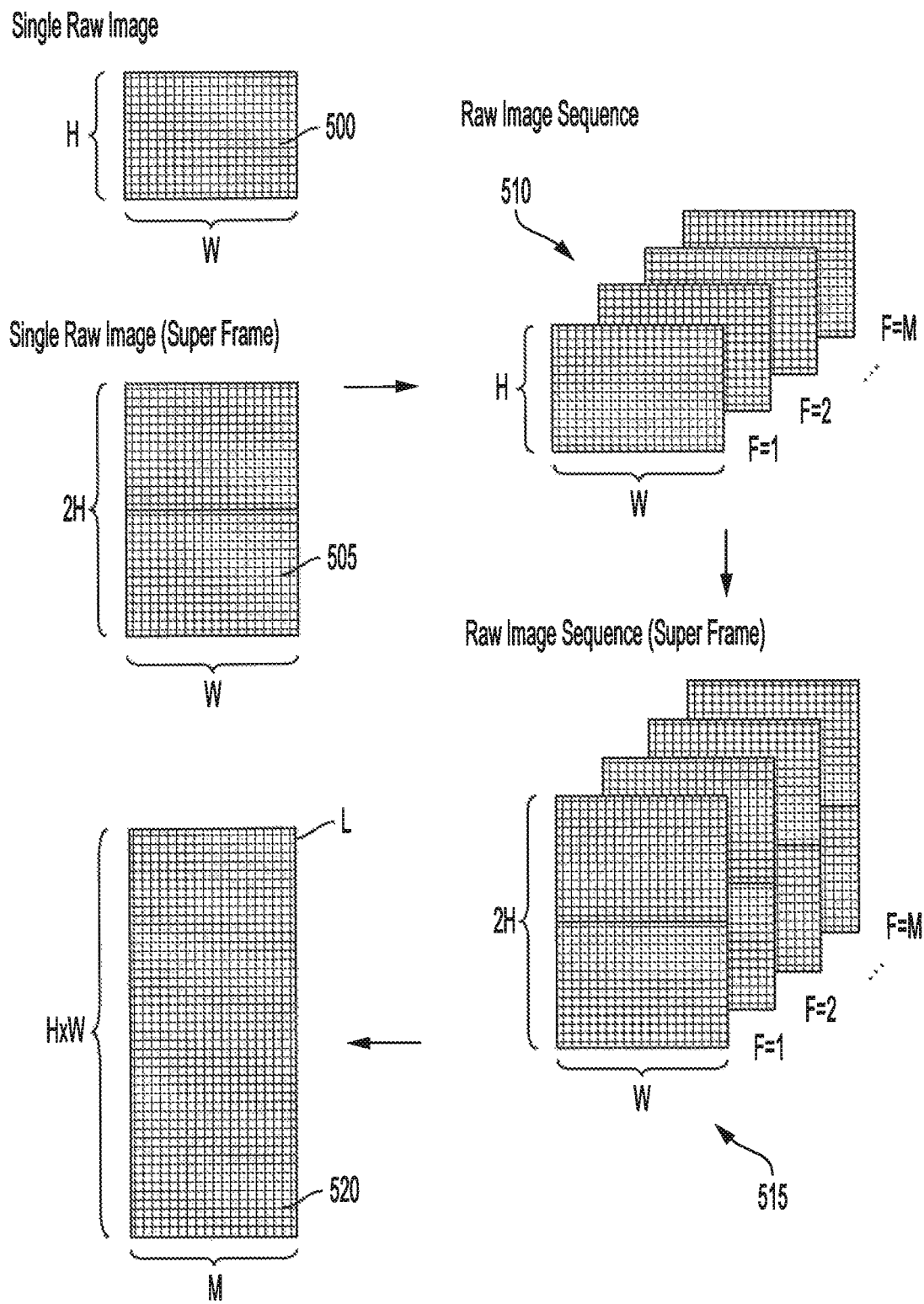
FIG. 5 is a visual example of generating a radiance map sequence, according to an aspect of the present disclosure.

At step 400, controller 145 generates a radiance map sequence from the raw image data captured using image capturing devices 135 and 140. Each of image capturing devices 135 and 140 may have adjustable sensitivities (integration times) that are controllable by controller 145. In one example, each of image capturing devices 135 and 140 may be configured with two (2) different integration times operating in an alternating sequence (super framing), which can in turn increase the dynamic range of captured image data by image capturing devices 135 and 140. Hereinafter, it is assumed that each of image capturing devices 135 and 140 is configured with two (2) integration times. The generation of a radiance map sequence is described below with reference to FIG. 5. FIG. 5 is a visual example of generating a radiance map sequence, according to an aspect of the present disclosure.

As shown in FIG. 5, a single captured image 500 (a single raw image frame captured at a discrete instance of time) has a size H×W, where His the vertical image size (pixels), W is the horizontal image size (pixels) and H and W are positive integers. FIG. 5 also illustrates a single captured super frame 505 of size 2H×W, where 2 corresponds to the 2 integration times set for each of image capturing devices 135 and 140.

Raw image data 510 (raw image sequence 510) is captured in a 3-dimensional (3D) matrix of size H×W×M where H and W are as described above and M is the number of frames in the sequence. M is also a positive integer.

Super frame 515 is captured in a 3-dimensional (30) matrix of size 2H×W×M. The 2 sub frames (recorded at 2 integration times) of height H are vertically stacked to form a super frame of height 2H.

Evaluating each super frame, each pixel inherits the value of 1 of the 2 sub frames based on magnitude and saturation state to form an aggregate raw image sequence that is a 3D matrix of size H×W×M. A calibration is applied to convert the raw output in Analog/Digital counts (A/D counts) to calibrated units of radiance (W cm^-sr^-1). The resulting radiance map sequence L (radiance map) 520 is a 3D matrix of size H×W×M. Stacking W columns of height H into M columns reshapes to represent the entire image sequence as a 2D matrix. The linear index of each column varies from 1 to (H×W). The size of the reshaped radiance map sequence L is (H×W)×M.

Figure 6:
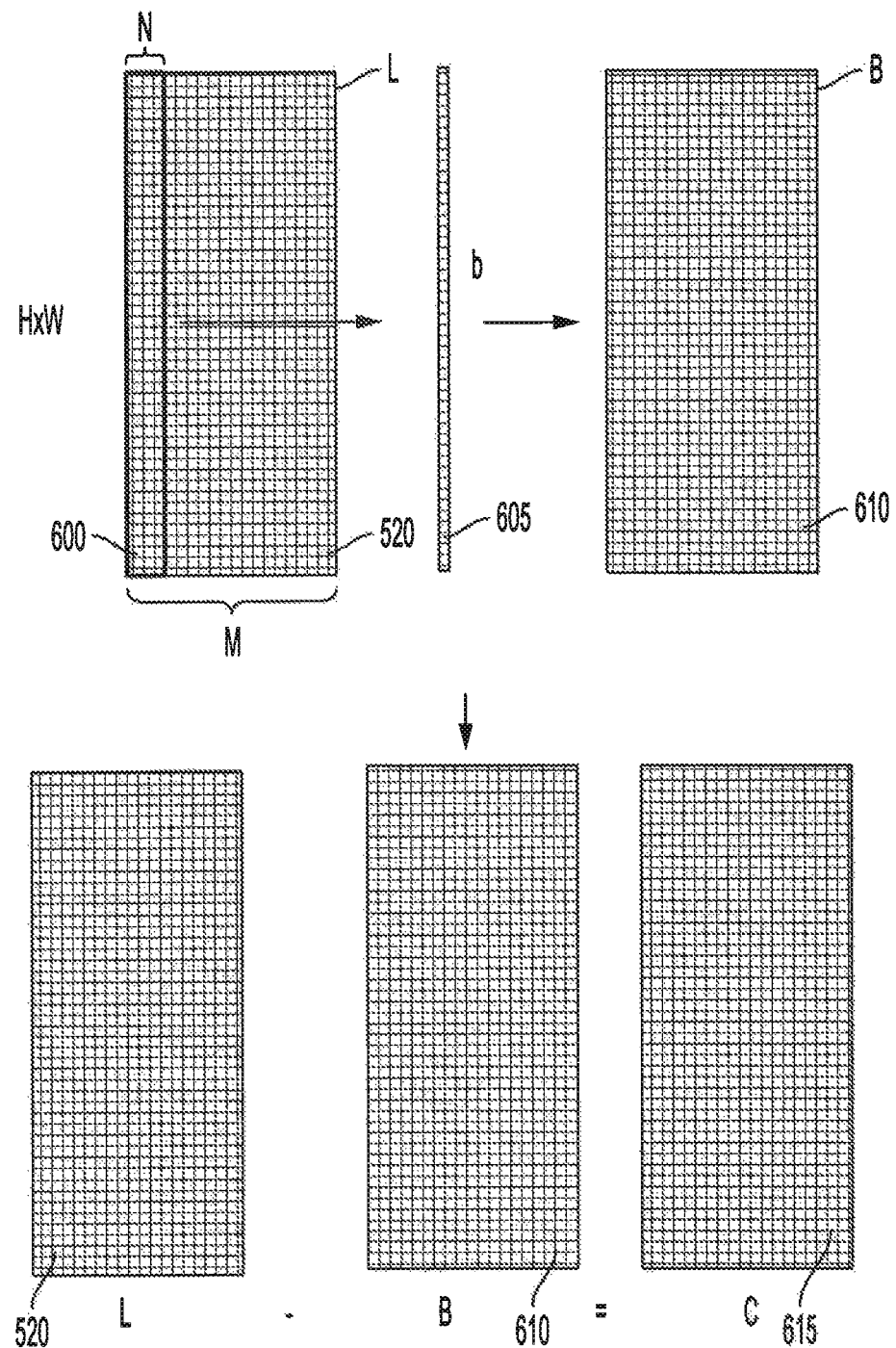
FIG. 6 is a visual example of filtering a radiance map, according to an aspect of the present disclosure.

Referring back to FIG. 4, at S405, controller 145 filters the radiance map 520, according to the following. The filtering process is described with reference to FIG. 6. FIG. 6 is a visual example of filtering a radiance map, according to an aspect of the present disclosure.

First, controller 145 defines an initial portion of the radiance map 520 of pre-specified time interval (corresponding to N frames where N is a positive integer and is less than M), over which the background state occurs (shown as background area 600 of radiance map 520).

Second, controller 145 determines a 1-dimensional (for each of M frames in the sequence) background radiance (1-dimensional column b 605). Each element $b_i$ of 1-dimensional column b is the mean value for pixel i ($L_{i,j}$) determined over N frames (j=1 . . . N), as given by Equation (1) below. The size of the background radiance array is (H×W)×1. Controller 145 repeats this process for M frames thus creating contrast radiance map 610 based on a matrix obtained through equation (1).

$$b_i = \frac{\sum_{j=1}^{N} L_{i,j}}{N} \quad (1)$$

Third, controller 145 filters radiance map 520 by subtracting radiance matrix 610 from radiance values of radiance map 520 to obtain filtered sequence map 615.

In one example, controller 145 may use a noise threshold (which can be a configurable parameter determined based on empirical studies and/or experiments) to block unwanted objects in the background scene from contributing to the signature of the target. Such noise threshold may be determined by determining overall average and standard deviation of pixels in radiance map 520 within the background area 600. The noise threshold may then be determined as a function of average and standard deviation of pixels in radiance map 520.

In one example, standard average and standard deviation of pixels are given by equations (2) and (3), respectively, with all variables thereof defined as above.

$$\bar{c} = \frac{\sum_{i=1}^{H*W} \sum_{j=1}^{N} C_{i,j}}{H*W*N} \quad (2)$$

$$s^2 = \frac{\sum_{i=1}^{H*W} \sum_{j=1}^{N} (C_{i,j} - \bar{c})^2}{H*W*N - 1} \quad (3)$$

Using equations (2) and (3), controller 145 determines the noise threshold, $T_{noise}$, as a function of $\bar{c}$ and $s^2$.

As part of filtering the radiance map at S405, controller 145 may optionally determine a frame cutoff, which indicates which portions of the filtered radiance map is not be analyzed in subsequent steps for identifying locations of release points and associated signatures (radiation intensities). To determine a frame cutoff, controller 145 may examine a radiance summation computed blindly on an entire frame (and may repeat doing so for all frames) and locate the frame at which a decay portion of an entire signature sequence drops below a cutoff threshold (which is a configurable parameter determined based on experiments and/or empirical studies). A frame for which a corresponding decay portion fails below the cutoff threshold, marks the end of the image sequence to be analyzed.

At S410, controller 145 computes a trajectory threshold (radiance threshold) for determining a trajectory of decoy 110 after release. The trajectory threshold maybe determined to be proportional to the noise threshold described above but may be larger in magnitude by a standardized factor.

At S415, controller 145 determines a trajectory along which decoy 110 travels after launch using the trajectory threshold. First, controller 145 performs the following process (process A).

First, controller 145 forms a set C0 of all pixels in filtered radiance map 615 over entire set of frames. Then, controller 145 screens the filtered radiance map 615 sequence to form set C1 by passing only those pixels in C0 registering above the trajectory threshold. Then, controller 145 defines X1 as a set of horizontal coordinate values associated with the pixels in set C1 From X1, controller 145 fins the maximum horizontal coordinate in X1 occurring in each frame to form horizontal coordinate set X2.

After forming X2, controller 145 applies a forward motion constraint to retain only values in X2 for which X2(i)>max(X2(1:i−1)). In other words, X2 value associated with frame i should exceed the maximum X2 value calculated over the set of preceding frames, frame 1 to frame i−1. The resulting set is X3.

Using X3, controller 145 forms coordinate matrix [X3, Y3] where Y3 is the set of vertical coordinates associated with X3. Lastly, controller 145 forms matrix [X4,Y4] by retaining only unique rows in matrix [X3,Y3]. The resulting matrix is a set of points used to identify the trajectory of decoy 110.

Controller 145 then determines if any points in matrix [X4,Y4] fall inside the dispenser window, which can be a window of predesignated size and location in the image that contains the dispenser. If so, matrix [X4,Y4] sufficiently defines pixel values corresponding to the trajectory (e.g., trajectory 115) with the inclusion of the initial position. If not, controller 145 performs the following process for determining the trajectory of decoy 110 (process B).

Controller 145 first decreases the trajectory threshold by a predefined increment (which may be a configurable parameter determined based on experiments and/or empirical studies. Using the new/adjusted trajectory threshold, controller 145 repeats process A to obtain [X4',Y4']. Controller 145 then determines if [X4',Y4'] falls within the same dispenser window. If yes, controller 145 defines [X4',Y4'] as pixel values corresponding to the trajectory 115. Otherwise, controller 145 repeats process B using a new (decremented) trajectory threshold until a resulting matrix that falls within the dispenser window is determined.

With trajectory 115 defined, at S420, controller 145 determines tangent slopes to trajectory 115. In one example, controller 145 utilizes interpolation to produce estimates for the discrete set of pixels associated with the horizontal image size (W), applies a moving window linear regression to obtain tangent line slope values, and utilizes interpolation to create a more densely spaced representation of both trajectory 115 and the tangent slopes (array s).

At S425, controller 145 determines a band centered on trajectory 115. In doing so, controller 145 determines slopes of lines normal to the tangents to. In order to determine the slopes of lines normal to the tangents, controller 145 defines sets of pixels residing on normal lines (slices) extending symmetrically about the trajectory 115 over a pre-specified fixed length. Together, these sets of pixels form a wider regional band of fixed width centered on trajectory 115 that will be used to project signature pixel coordinates onto trajectory to track forward progress of the signatures.

At S430, controller 145 identifies all signature pixels located inside this band over the entire image sequence and projects coordinate of each signature pixel onto trajectory 115 by assigning to a point on trajectory 115 to which it is closest by definition of shortest distance normal to trajectory 115.

At S435, controller 145 repeats S425 to define a narrower regional band centered on trajectory 115. In doing so, controller 145 determines slopes of lines normal to tangents. Define sets of pixels residing on normal lines (slices) extending symmetrically about trajectory 115 over pre-specified fixed length. Together, these sets of pixels form a narrower regional band of fixed width centered on trajectory that will be analyzed to identify the signature release points.

At S440, controller 145 filters the narrower regional band to remove noise and produce a more continuous representation of the band and trajectory 115 for identifying release points of decoy 110. Filtering of the narrower regional band is as follows.

First, controller 145 forms a matrix, with each column being formed of pixel values of a slice of the narrower regional band normal to a tangent line at the point of contact with trajectory 115. This matrix is a 2-dimensional matrix of time (along the row direction) while the column dimension of the matrix is a summation of pixels contained in discrete shoes of the radiance map 610 tangentially located along trajectory 115 with pixel values exceeding the trajectory threshold (radiance threshold).

A moving window of size $\Delta s \times \Delta t$ (having odd values) is applied to the 2-dimensional matrix for filtering the pixel values in the matrix according to equation (4) below:

$$F(i, j) = \sum_{i - \frac{(\Delta t - 1)}{2}}^{i + \frac{(\Delta t - 1)}{2}} \sum_{j - \frac{(\Delta s - 1)}{2}}^{j + \frac{(\Delta s - 1)}{2}} C(i, j) \quad (4)$$

Output of filter F is a 2-dimensional matrix with time along the row dimension. Column dimension of filter output is a summation in the moving window of size $\Delta s \times \Delta t$, per equation (4) above.

Figure 7:
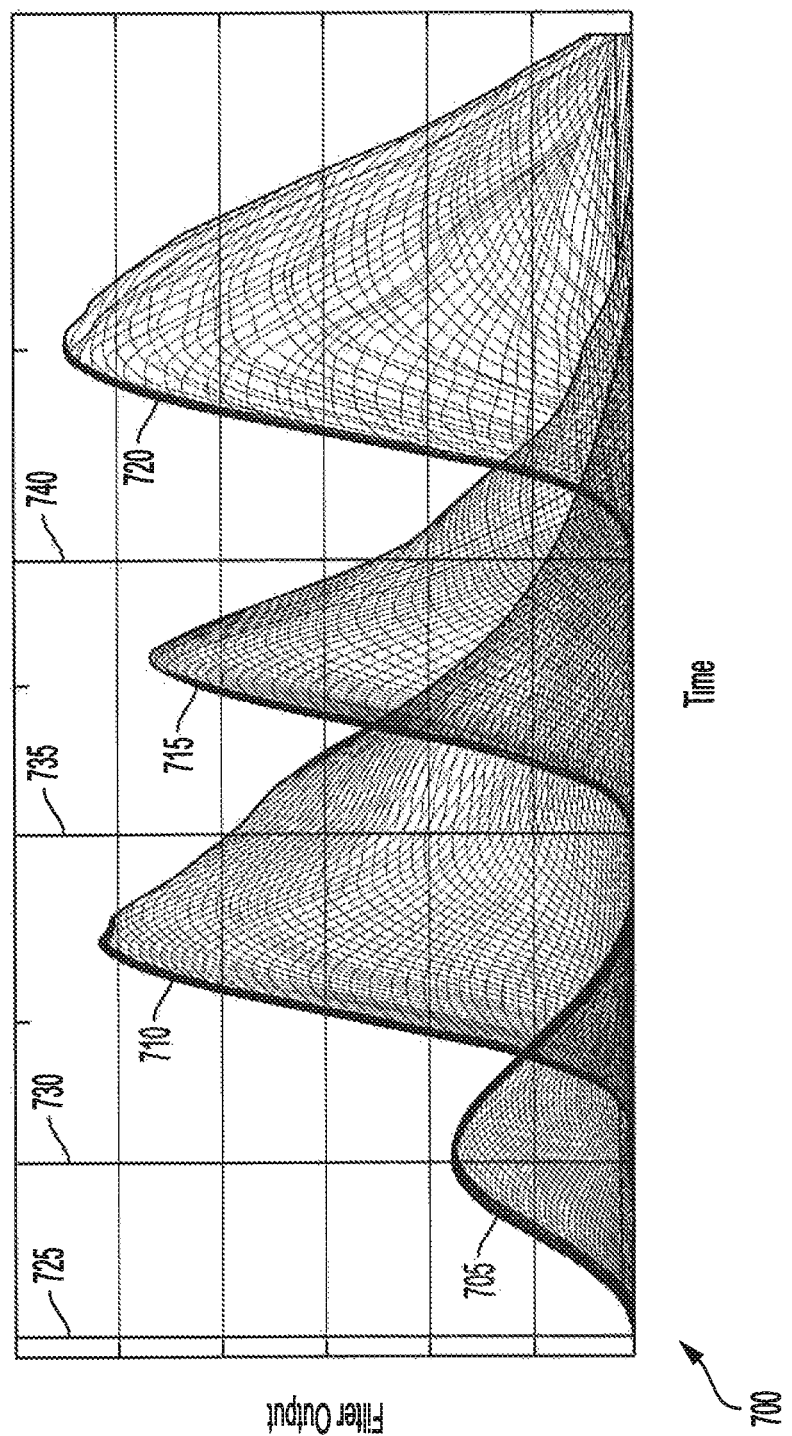
FIG. 7 illustrates an example output of filtering the regional band centered around a trajectory, according to an aspect of the present disclosure.

FIG. 7 illustrates an example output of filtering the regional band centered around a trajectory, according to an aspect of the present disclosure. Graph 700 is an example of filter output of S440 versus time for an arbitrary signature. Each curve represents the filter output versus time at the corresponding tangential location along trajectory 115 (e.g., a single column in the 2D filter output matrix F of equation (4) above). The grayscale colors of the curves are shown varying from dark to light with ascending tangential location to provide clearer distinction between signatures in time intervals where multiple signatures are emitted. Curves 705, 710, 715, and 720 signify the presence of individual segments of decoy 110. Vertical lines 725, 730, 735 and 740 corresponding to times at which each segment of decoy 110 is released (release points). A process according to which the release times are determined is as follows.

At S445, controller 145 identifies release points of launched decoy 110. In order to identify the release points, controller 145 defines maximum filter output F-max (of equation (4)) as a 1D array of maximum values registered in time at each tangential position relative to trajectory 115. Controller 145 then performs interpolation to provide a more densely space representation of the tangential position array s and the maximum filter output array F-max.

Controller 145 then determines a derivate of F-max with respect to s and determines points where the derivative is zero. The points (candidate points) at which the derivative is zero, form a set of candidates of release points of decoy 110.

Among the candidate points, the ones having the largest amplitudes in a descending order are identified until a desired number of release points are Identified (controller 145 may have prior information of the number of release points for decoy 110 depending on a number of segments (e.g., 4 segments shown in example of FIG. 2).

For each identified point, controller 145 records the associated time (time at which the release point was captured) and the associated (x,y) coordinates.

With release points identified, at S450, controller 145 performs an automatic segmentation of the image into regions such that each region is occupied by only a single signature. In doing so, controller 145 initializes boundary lines to pass through the release points determined at S445 and are constrained to be normal to trajectory 115. The segmentation process is repeated for every adjacent pair of signatures in every image (frame) of the filtered radiance map 610. The segmentations may be performed within a given frame in reverse order from last signature (latest release) to first signature (earnest release).

Figure 8:
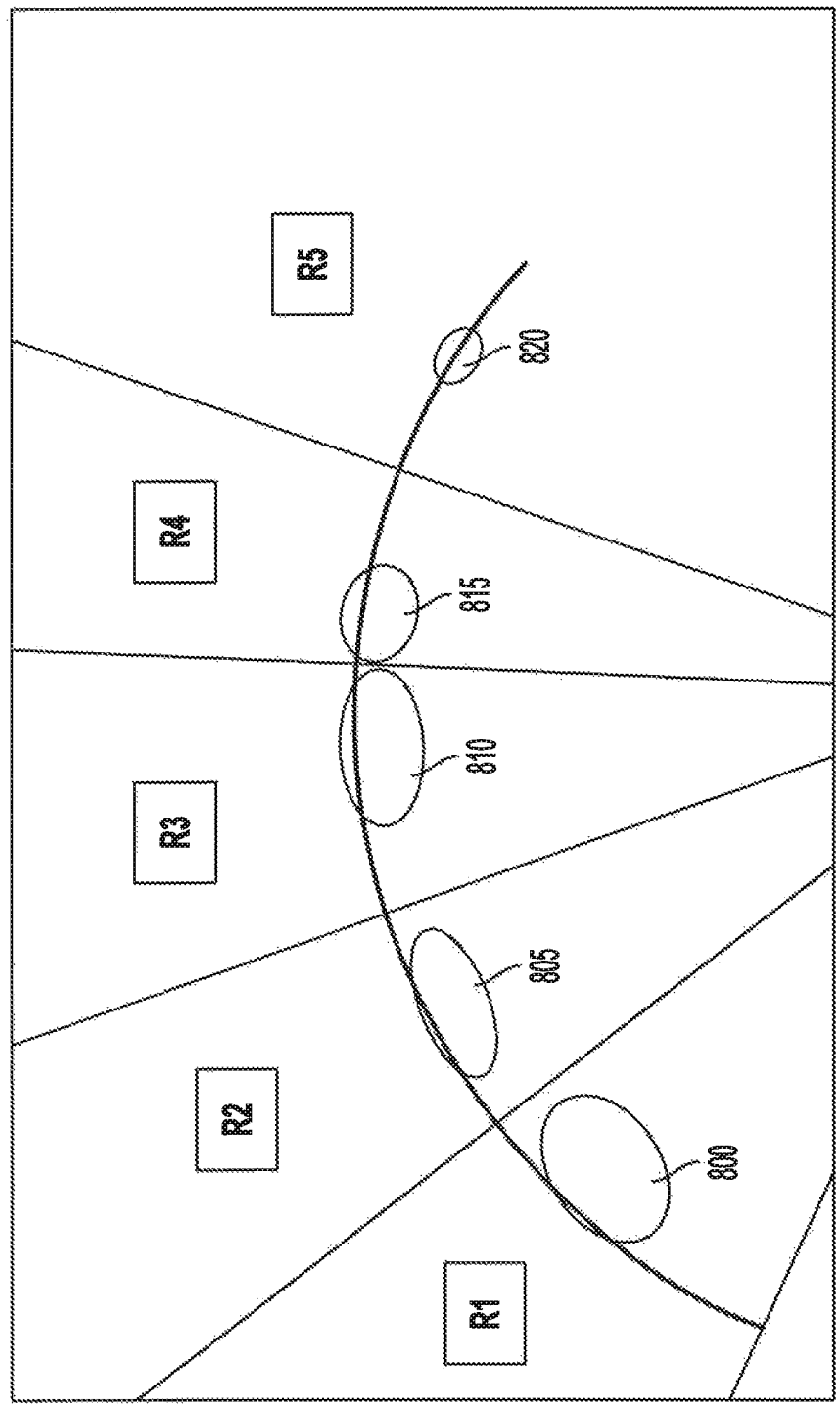
FIG. 8 is an example of multi-signature sequence of a decoy, according to an aspect of the present disclosure.

The segmentation process will be described below with reference to FIG. 8. FIG. 8 is an example of multi-signature sequence of a decoy, according to an aspect of the present disclosure. As shown in example of FIG. 8, a decoy may have 5 release points, each having one of signatures 800, 805, 810, 815 and 820 each occupying one of regions R1, R2, R3, R4 or R5. While segmentation may be relatively straightforward for separating signature 800 from signature 805, doing so may not be as straightforward for signatures 810 and 815. The segmentation process is therefore described below with reference to signatures 810 and 815, occupying regions R3 and R4 respectively. Note that the regions are additionally bounded by neighboring boundary lines and edges of the image.

First, controller 145 determines an initial boundary to differentiate between signatures 810 and 815. However, there may pixels associated with signature 810 or 815 that may cross the initial boundary to be grouped with pixels of the other one of signatures 810 and 815. Therefore, the initial boundary should be updated.

In updating the initial boundary, controller 145 determines a threshold value for each signature region of signatures 810 and 815, based on the statistical distribution of radiance values within each region.

For pixels in each region exceeding the threshold, controller 145 determines a Euclidean distance to the initial boundary. There may be limits on minimum and maximum number of pixels that may be selected on either side of the initial boundary.

Then, controller 145 selects pixels having closest proximity to the initial boundary by definition of shortest normal distance. This set of selected pixels is then treated as one without classification (as if these pixel values do not belong to signatures 810 and 815). Controller 145 uses the coordinates associated with this set of pixels in a clustering algorithm (e.g., a k-means clustering algorithm). The input for number of clusters is 2 (since in this example we are focusing on segmenting signatures 810 and 815 only).

A similarity measure related to the Euclidean distance to a cluster centroid is used. The similarity is evaluated based on total sum of squares of individual distances computed within each cluster (distances from individual pixels to centroid of the cluster to which they belong). After random initialization of cluster centroids and computation of initial similarity values, the algorithm initiates a loop that ceases once the fraction of change in similarity value between consecutive iterations has reached a threshold. Within each iteration of this process, controller 145 assigns individual pixels to the cluster whose centroid is closest. Cluster centroids and similarity value are updated using the new pixel assignment. The algorithm concludes with a cluster arrangement yielding optimally low sum of squares value (high similarity value).

Controller 145 then transforms cluster results from a 2-dimensional space to a 3-dimensional space by adding a $3^{rd}$ dimension that expresses cluster classification as either −1 or 1. Controller 145 then runs a linear least squares regression on the resulting data set.

Controller 145 then determines an intersection of a fitted plane through the pixels points in the two clusters and the place Z=0. This intersection forms a boundary separating the 2 clusters. Furthermore, controller 145 determines a midpoint between the 2 clusters by drawing a line connecting the centroids of the 2 clusters and finding an intersection thereof with boundary separating the 2 clusters. This intersection is the midpoint between the 2 clusters.

Controller 145 then finds a new (updated) boundary for separating signatures 810 and 815 by finding a line that is normal to trajectory 115 and passes through the midpoint of the 2 clusters. Pixel points on each side of the new boundary are assigned to signatures 810 or 815.

Figure 9:
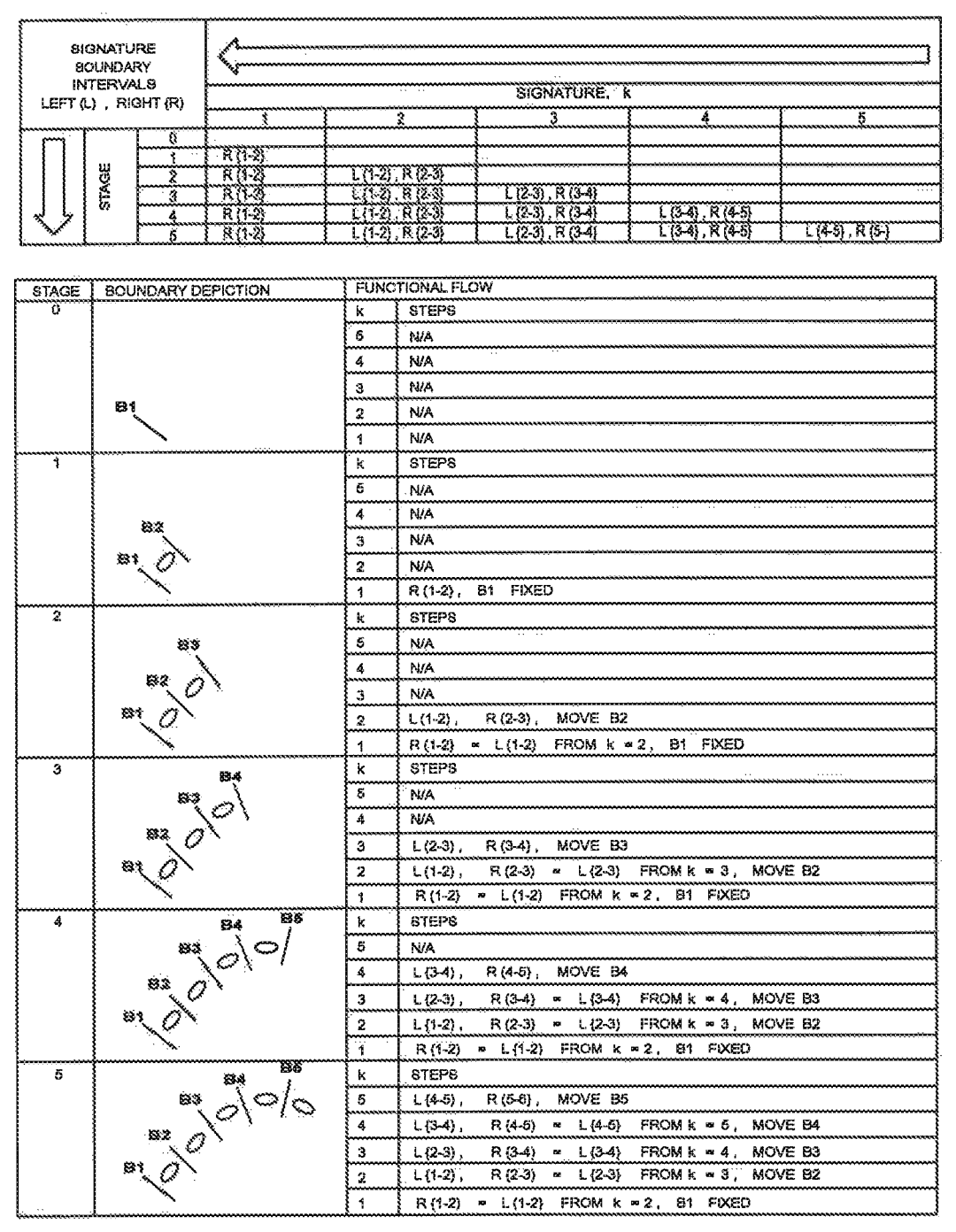

FIG. 9 is an example segmentation table for all five signatures of example of FIG. 8, according to an aspect of the present disclosure.

Referring back to FIG. 4 and with release points identified and signatures segmented, at S455, controller 145 determines an intensity (within the spectral band of the measurement) of each signature originating at the corresponding release point.

In one example, a data set of time resolved arrays of pixel membership groupings (each group representing a different signature at a different release point) that contain the x-y coordinates and radiance values of all pixels. Controller 145 determines performance metrics from this data set. Controller 145 determines a radiant intensity (W sr^−1) vs. time as the sum product of radiance and area over the corresponding pixel group where area is calculated as a function of standoff distance using the thin lens equation. Standoff distance may vary by horizontal position in the image to account for the geometry of the setup where launch pad 105 is angled towards one or more of the image capturing devices 135 and/or 140. This sum of the individual signature intensities may match the combined intensity profile blindly computed on the entire image (for frame cutoff described above).

Controller 145 may also determine a color ratio once the intensities in two (2) bands have been computed as well as additional radiometric metrics from the intensity vs. time profiles. Time resolved spatial metrics such as radiance distributions, radiance weighted centroids, or shape parameters may also be determined from the pixel membership groupings.

Having described various examples of an autonomous and objective method of validating performance of a launched decoy, the present disclosure now turns to description of example components and architecture of a device to be used as controller 145.

Figure 10:
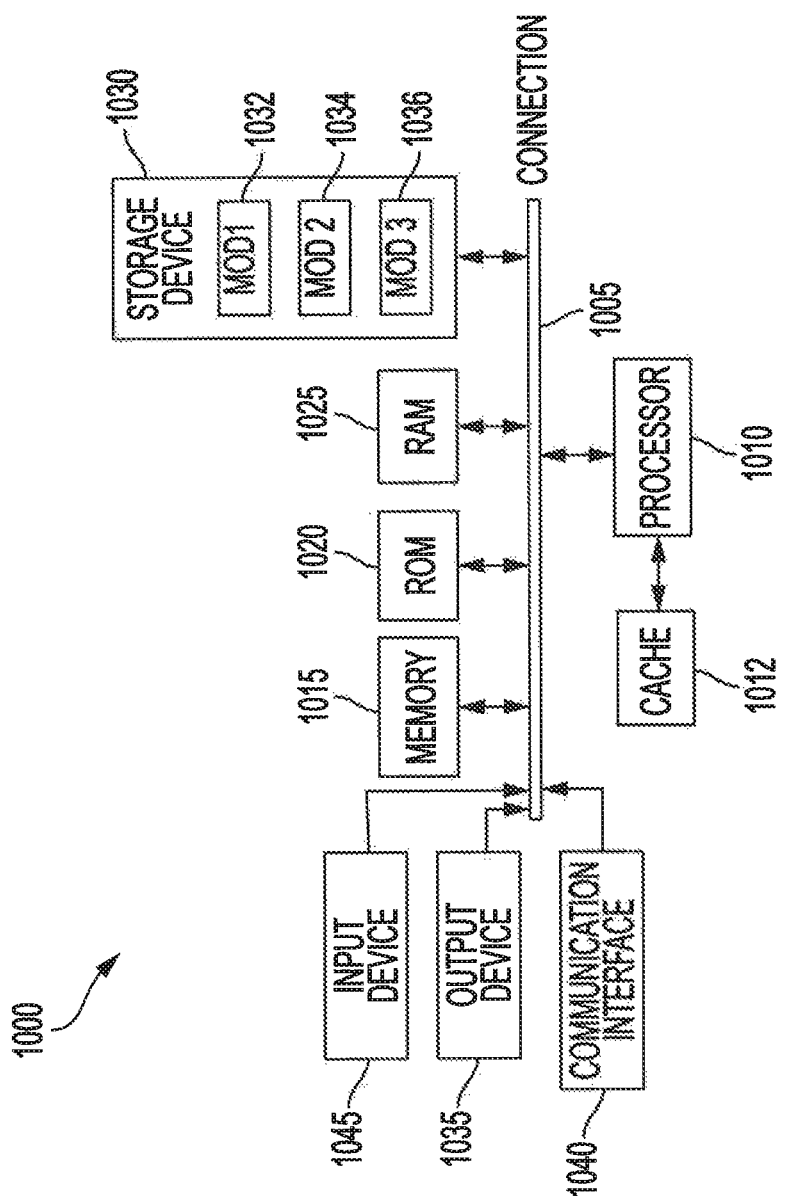
FIG. 10 illustrates computing system architecture of controller of FIG. 1, according to an aspect of the present disclosure.

FIG. 10 illustrates computing system architecture of controller of FIG. 1, according to an aspect of the present disclosure. Computing system architecture 1000 has components that are in electrical communication with each other using a connection 1005, such as a bus. Exemplary system 1000 includes a processing unit (CPU or processor) 1010 and a system connection 1005 that couples various system components including the system memory 1015, such as read only memory (ROM) 1020 and random access memory (RAM) 1025, to the processor 1010. The device 1000 can include a cache of high-speed memory connected directly with, in close proximity to, or integrated as part of the processor 1010. The device 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    capturing, using at least one image capturing device, raw image data of a launched decoy, the decoy having one or more segments configured to be released after launch;
    automatically processing the raw image data to:
    (1) identify a release point for each of the one or more segments and
    (2) identify an infrared signature associated with each release point; and
    generating a visual display of the release point(s) of the one or more segments and the infrared signature(s) originating from the release point(s);
        wherein electronically processing the raw image data comprises:
        generating a radiance map sequence of the launched decoy based on the raw image data;
        filtering the radiance map to remove background noise to yield a filtered radiance map; and
        determining, using the filtered radiance map, a trajectory along which the launched decoy travels, wherein each release point is identified within a band around the trajectory.

2. The method of claim 1, wherein generating the radiance map comprises:
    for each of a plurality of integration times, generating a corresponding radiation map based on a corresponding portion of the raw image data; and
    forming the radiance map sequence for the plurality of integration times by aggregating radiance maps generated for the plurality of integration times.

3. The method of claim 2, wherein the filtered radiance map illustrates radiation contrast between a target and a background.

4. The method of claim 1, wherein identifying the release point for each of the one or more segments comprises:
    identifying pixels forming a discrete slice at every point normal to the trajectory;
    for each discrete slice having a corresponding time value at which the raw image data was captured, identifying corresponding pixel values exceeding a radiance threshold;
    forming a two-dimensional matrix value of time versus the corresponding pixel values; and
    applying a moving window to the two-dimensional matrix to identify slices corresponding to release points of the one or more segments.

5. The method of claim 4, further comprising:
    segmenting a plane on which the trajectory is formed such that the infrared signature associated with each release point is associated with a different segment of the plane.

6. The method of claim 1, wherein determining an infrared signature associated with each release point comprises determining radiance values of each pixel forming a corresponding infrared signature.

7. A system comprising:
    at least one image capturing device; and one or more processors configured to execute computer-readable instructions stored in one or more memories to:
    receive raw image data of a launched decoy captured by the at least one image capturing device, the decoy having one or more segments configured to be released after launch;
automatically process the raw image data to:
(1) identify a release point for each of the one or more segments; and
(2) identify an infrared signature associated with each release point; and
generate a visual display of the release point(s) of the one or more segments and the infrared signature(s) originating from the release point(s);
wherein the processor is configured to process the raw image data by:
generating a radiance map sequence of the launched decoy based on the raw image data;
filtering the radiance map to remove background noise to yield a filtered radiance map; and
determining, using the filtered radiance map, a trajectory along which the launched decoy travels, wherein each release point is identified within a band around the trajectory.

8. The device of claim 7, wherein the processor is configured to generate the radiance map by:
for each of a plurality of integration times, generating a corresponding radiation map based on a corresponding portion of the raw image data; and
forming the radiance map sequence for the plurality of integration times by aggregating radiance maps generated for the plurality of integration times.

9. The device of claim 8, wherein the filtered radiance map illustrates radiation contrast between a target and a background.

10. The device of claim 7, wherein the processor is configured to identify the release point for each of the one or more segments by:
identifying pixels forming a discrete slice at every point normal to the trajectory;
for each discrete slice having a corresponding time value at which the raw image data was captured, identifying corresponding pixel values exceeding a radiance threshold;
forming a two-dimensional matrix value of time versus the corresponding pixel values; and
applying a moving window to the two-dimensional matrix to identify slices corresponding to release points of the one or more segments.

11. The device of claim 10, wherein the processor is further configured to a plane on which the trajectory is formed such that the infrared signature associated with each release point is associated with a different segment of the plane.

12. The device of claim 7, wherein the processor is configured to determine an infrared signature associated with each release point comprises determining radiance values of each pixel forming a corresponding infrared signature.

13. One or more non-transitory computer-readable medium having computer-readable instructions stored thereon, which when executed by one or more processors, cause the one or more processors to:
capture raw image data of a launched decoy captured by at least one image capturing device, the decoy having one or more segments configured to be released after launch;
automatically process the raw image data to:
(1) identify a release point for each of the one or more segments; and
(2) identify an infrared signature associated with each release point; and
generate a visual display of the release point(s) of the one or more segments and the infrared signature(s) originating from the release point(s);
wherein the execution of the computer-readable instructions cause the one or more processors to process the raw image data by:
generating a radiance map sequence of the launched decoy based on the raw image data;
filtering the radiance map to remove background noise to yield a filtered radiance map; and
determining, using the filtered radiance map, a trajectory along which the launched decoy travels, wherein each release point is identified within a band around the trajectory.

14. The one or more non-transitory computer-readable medium of claim 13, wherein the execution of the computer-readable instructions cause the one or more processors to generate the radiance map by:
for each of a plurality of integration times, generating a corresponding radiation map based on a corresponding portion of the raw image data; and
forming the radiance map sequence for the plurality of integration times by aggregating radiance maps generated for the plurality of integration times.

15. The one or more non-transitory computer-readable medium of claim 13, wherein the execution of the computer-readable instructions cause the one or more processors to identify the release point for each of the one or more segments by:
identifying pixels forming a discrete slice at every point normal to the trajectory;
for each discrete slice having a corresponding time value at which the raw image data was captured, identifying corresponding pixel values exceeding a radiance threshold;
forming a two-dimensional matrix value of time versus the corresponding pixel values; and
applying a moving window to the two-dimensional matrix to identify slices corresponding to release points of the one or more segments.

16. The one or more non-transitory computer-readable medium of claim 15, wherein the execution of the computer-readable instructions cause the one or more processors to segment a plane on which the trajectory is formed such that the infrared signature associated with each release point is associated with a different segment of the plane.

17. The one or more non-transitory computer-readable medium of claim 13, wherein the execution of the computer-readable instructions cause the one or more processors to determine an infrared signature associated with each release point comprises determining radiance values of each pixel forming a corresponding infrared signature.

* * * * *